United States Patent
Diaz Sanchez et al.

(10) Patent No.: US 8,807,636 B2
(45) Date of Patent: Aug. 19, 2014

(54) INJECTION MOULDED STRUCTURAL COMPONENT WITH A HOLLOW STRUCTURAL SECTION

(71) Applicant: Faurecia Exteriors GmbH, Stadthagen (DE)

(72) Inventors: Francisco Javier Diaz Sanchez, Pleinfeld (DE); Dirk Bücker, Monchengladbach (DE); Hergen Görse, Roth (DE); Yann Clapie, Stammham (DE); Frank Nikol, Wettstetten (DE)

(73) Assignee: Faurecia Exteriors GmbH, Stadthagen (DE)

( * ) Notice: Subject to any disclaimer, the term of this patent is extended or adjusted under 35 U.S.C. 154(b) by 0 days.

(21) Appl. No.: 13/789,294

(22) Filed: Mar. 7, 2013

(65) Prior Publication Data

US 2013/0234472 A1 Sep. 12, 2013

(30) Foreign Application Priority Data

Mar. 8, 2012 (DE) .......................... 10 2012 004 411
Jul. 11, 2012 (DE) .......................... 10 2012 013 672

(51) Int. Cl.
*B60N 99/00* (2006.01)
*B62D 25/08* (2006.01)
*B62D 29/04* (2006.01)
*B62D 29/00* (2006.01)
*B29C 45/00* (2006.01)
*B29L 31/30* (2006.01)

(52) U.S. Cl.
CPC .............. *B62D 25/08* (2013.01); *B62D 29/043* (2013.01); *B62D 25/085* (2013.01); *B29L 2031/30* (2013.01); *B62D 29/004* (2013.01); *B29C 45/0017* (2013.01); *B29C 45/006* (2013.01); *B29C 45/0081* (2013.01); *B62D 29/048* (2013.01)
USPC ....................................... 296/193.09; 264/242

(58) Field of Classification Search
CPC .... B62D 25/08; B62D 25/085; B62D 29/043; B29C 45/00; B29C 45/0017
USPC ............. 296/193.09; 264/242; 156/272.8, 92; 428/34.5
See application file for complete search history.

(56) References Cited

U.S. PATENT DOCUMENTS

| | | | |
|---|---|---|---|
| 8,196,978 B2 * | 6/2012 | Shin ............................... | 293/115 |
| 2004/0084236 A1 * | 5/2004 | Okai et al. ................... | 180/68.4 |
| 2007/0182211 A1 * | 8/2007 | Sub .......................... | 296/193.09 |

* cited by examiner

*Primary Examiner* — Lori Lyjak
(74) *Attorney, Agent, or Firm* — Dowell & Dowell, PC

(57) ABSTRACT

An injection-molded structural component, particularly for automotive front end carriers, with a hollow structural section, the hollow structural section including a section body having a cavity with an opening, a section lid secured to the section body via a hinge and hinge-folded onto the opening, and a fastener element for fastening the section lid to the section body such that the hollow structural section withstands dynamical load.

15 Claims, 5 Drawing Sheets

INJECTION MOULDED STRUCTURAL
COMPONENT WITH A HOLLOW
STRUCTURAL SECTION

BACKGROUND OF THE INVENTION

1. Field of the Invention

The present invention relates to injection-moulded structural components in high stiffness, high strength and low weight applications and their manufacture. More particularly, the present invention relates to injection-moulded front end carriers of automotive front end modules.

2. Brief Discussion of the Prior Art

Typically, structural components such as automotive front end carriers are manufactured by injection moulding and include rib-reinforced U-sections. However, these U-sections suffer from a limited stiffness. Also, their weight is increased by the reinforcement ribs. It would thus be desirable to replace the U-sections by hollow structural sections since the latter represent the better trade-off with regard to high stiffness vs. low weight. Yet, the implementation of hollow structural sections in injection-moulded structural components has failed so far because a hollow structural section, due to its closed cross-section, cannot be separated from the injection mould.

SUMMARY OF THE INVENTION

Accordingly, it is a first object of the present invention to provide an injection-moulded structural component with a hollow structural section to ensure highest possible stiffness and lowest possible weight.

A second object of the present invention is to provide a particularly simple, quick and cheap method of manufacturing such a structural component.

These objects are achieved by an injection-moulded structural component with a hollow structural section, said hollow structural section comprising:
  a section body having a cavity with an opening;
  a section lid secured to said section body via a hinge and hinge-folded onto said opening; and
  a fastening means fastening the section lid to the section body onto the opening and preventing an unfolding of the section lid.

Thanks to the hinge-folded lid and the fastening means, one obtains a structural component with a stiff and lightweight hollow structural section that can be manufactured by injection-moulding. In particular, the resulting hollow structural section is able to withstand substantial dynamical load.

Said objects are also achieved by a method of manufacturing a structural component with a hollow structural section, in particular the structural component as described above, comprising the following steps:
  injection-moulding the structural component with a section body having an open cavity and a section lid secured to the section body via a hinge, wherein the section lid sticks out in an open position from the section body;
  hinge-folding the section lid onto the section body thus closing the open cavity; and
  fastening the section lid to the section body and onto the open cavity thus obtaining the hollow structural section, the fastening being such that an unfolding of the section lid is prevented.

According to preferred embodiments, the inventive structural component may have one, several or all of the following features, in all technically possible combinations:

the fastening means comprises a circumferential welding seam;
  the fastening means comprises a plurality of rivets;
  the rivets have welded rivet heads;
  the rivets are integrally formed with one of the section body or the section lid and extend through corresponding apertures in the other of the section body or the section lid;
  each rivet has a shaft with a shaft broad side and a shaft narrow side, the shaft broad side of at least two different rivets having a different orientation;
  a first rivet having a shaft broad side at a right angle to the shaft broad side of a second rivet;
  it is made of reinforced plastic, such as glass-fibre reinforced plastic, in particular glass-fibre reinforced polypropylene;
  it includes a reinforcing metal insert;
  at least the section body, the section lid and the hinge are made from the same material;
  it consists of an automotive front end carrier.

The inventive manufacturing method may have one, several or all of the following features, in all technically possible combinations:
  the fastening involves laser or ultrasonic welding;
  the fastening involves riveting.

The invention also relates to an automotive front end module with a structural component as described above, and to a motor vehicle with such a front end module.

BRIEF DESCRIPTION OF THE SEVERAL
VIEWS OF THE DRAWINGS

The invention will now be described in detail with reference to the accompanying drawings, in which.

DETAILED DESCRIPTION OF THE INVENTION

Figure 1:
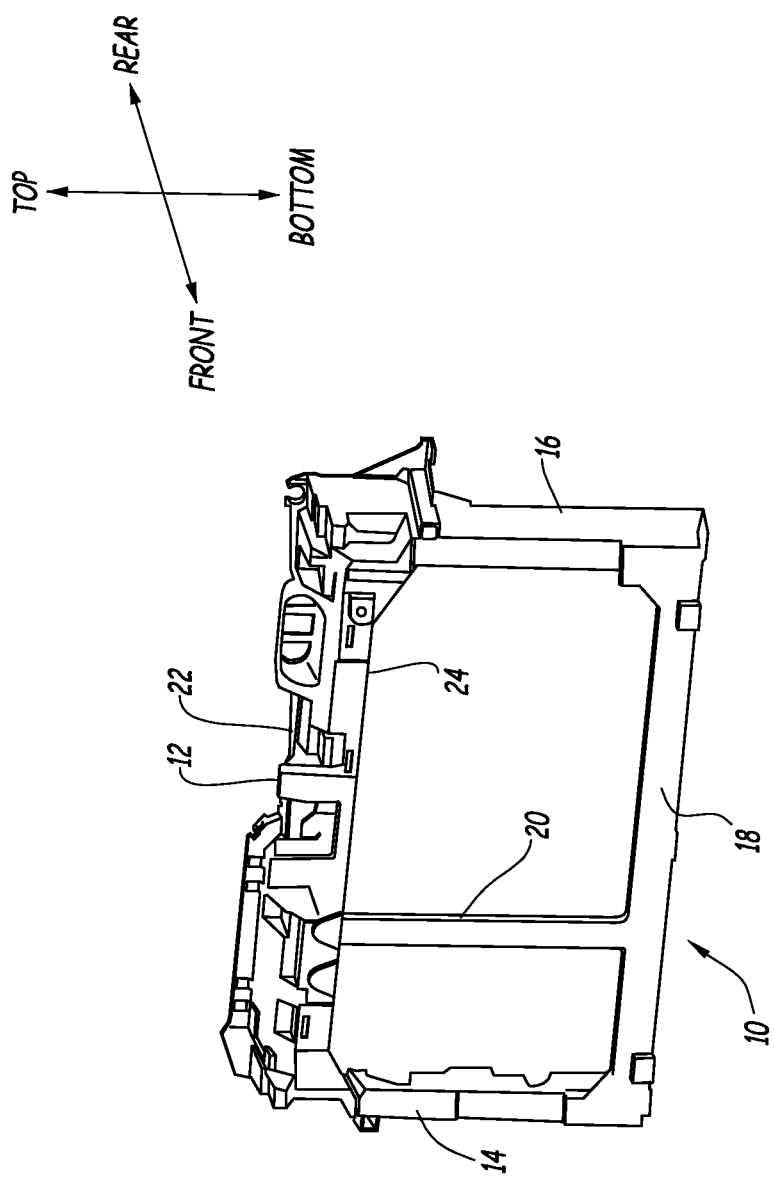
FIG. 1 is a perspective view of an automotive front end carrier according to the invention.

FIG. 1 shows an automotive front end carrier 10. This carrier is part of the automotive front end module of a motor vehicle and supports the various elements which make up the front end module.

Preferably, the carrier 10 is made of plastic, in particular glass-fibre reinforced polypropylene and obtained by injection-moulding.

Carrier 10 has a generally rectangular shape. It includes an upper horizontal hollow structural section 12, two vertical support beams 14 and 16, a lower horizontal support section 18, and a vertical strut 20 extending between the upper horizontal hollow structural section 12 and the lower horizontal support section 18.

Figure 2:
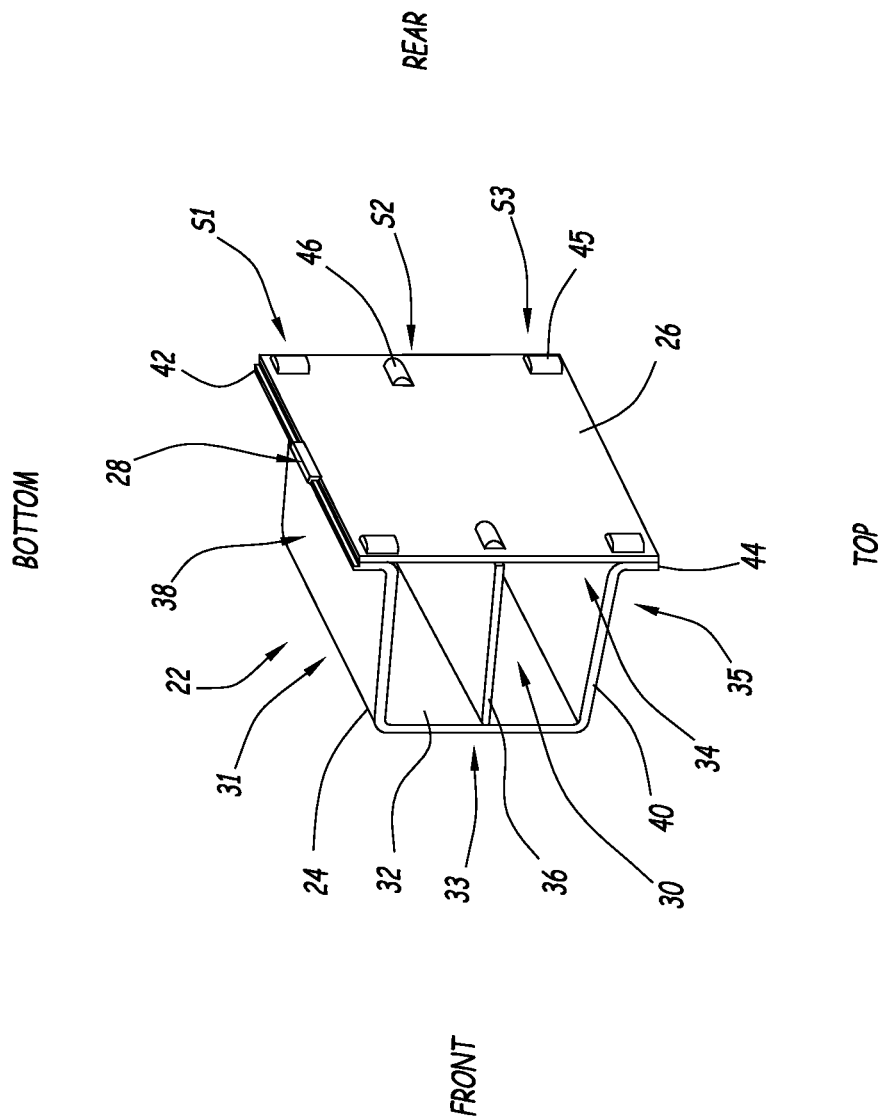
FIG. 2 is a perspective view of a portion of the hollow structural section of the automotive front end carrier of FIG. 1.

A portion 22 (delimited by dotted lines) of the hollow structural section 12 is shown in greater detail in FIG. 2.

The hollow structural section 12 comprises a section body 24, a first section lid 26 and a first hinge 28 securing the first section lid 26 to the section body 24.

Preferably, the first section lid 26 is a rectangular plate. In the present embodiment, the plate 26 has a plurality of fastening apertures 29 (cf. FIG. 4). A first row R1 of fastening apertures 29 is arranged along the lower end 31 of section body 24, a second row R2 of fastening apertures 29 is arranged along the centre 33 of section body 24, and a third row R3 of fastening apertures 29 is arranged along the upper end 35 of section body 24. Preferably, the fastening apertures 29 have a rectangular shape. In this case, the fastening apertures 29 of the second row R2 may be substantially at right angles to the fastening apertures of the other rows R1 and R3.

Preferably, the section body 24 is a U-section defining a cavity 30 with a bottom 32 and an opening 34. The cavity 30 may be subdivided in the longitudinal direction by a partition 36 extending from the bottom 32 to the opening 34. The cavity 30 is delimited by two side walls 38 and 40. The side walls 38, 40 each end in a fastening flange 42, 44.

Each fastening flange 42, 44 and the partition 36 include a series of integral rivets 46. Accordingly, the hollow structural section 12 has a lower row S1 of lower rivets, a central row S2 of central rivets, and an upper row S3 of upper rivets.

Preferably, each rivet 46 has a rivet head 45 and a rivet shaft 47. Each rivet shaft 47 may have a broad side 48 and a narrow side 50. In this case, the shaft broad sides of the central rivets may substantially be at right angles to the shaft broad sides of the upper and lower rivets.

Each rivet shaft 47 extends through a corresponding fastening aperture 29 of the first section lid 26. Each rivet head 45 covers a corresponding aperture 29.

The first hinge 28 is made of a thin film connecting one fastening flange 42 to the first section lid 26.

Figure 3:
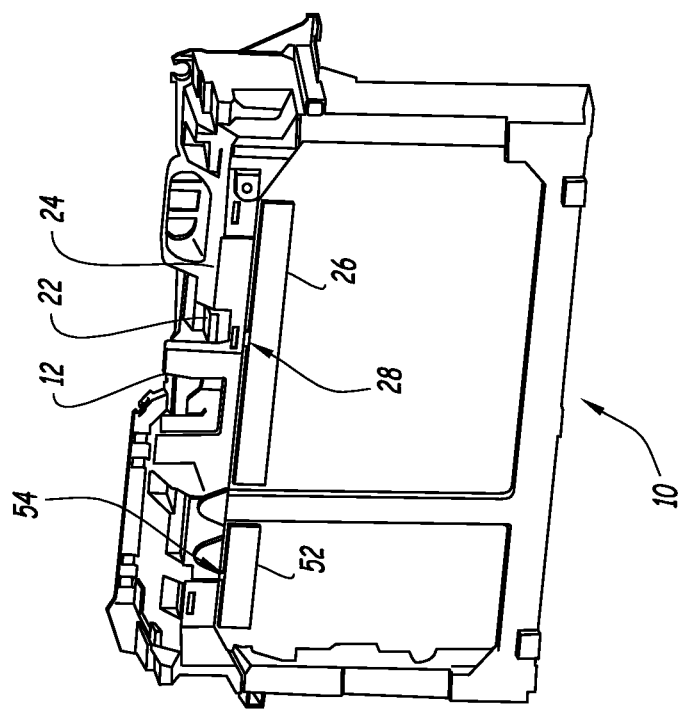
FIGS. 3 to 5 show the manufacture of the inventive front end carrier.

With reference to FIG. 3, the hollow structural section 12 may comprise a second section lid 52 with a second hinge 54. The second section lid 52 operates in the same manner as the first section lid 26.

In the following, the preferred method of manufacturing the front end carrier 10 will be described.

As a first step, an injection mould with a cavity in the shape of the front end carrier 10 is provided. Plastic, such as glass-fibre reinforced polypropylene, is injected into the mould, thus forming the front end carrier with opened section lids 26 and 52 as shown in FIG. 3. If desired, reinforcing metal inserts can be positioned inside the mould prior to injecting the plastic. These inserts reinforce the carrier 10 in areas that will be subjected to particularly high loads during operation.

Figure 4:
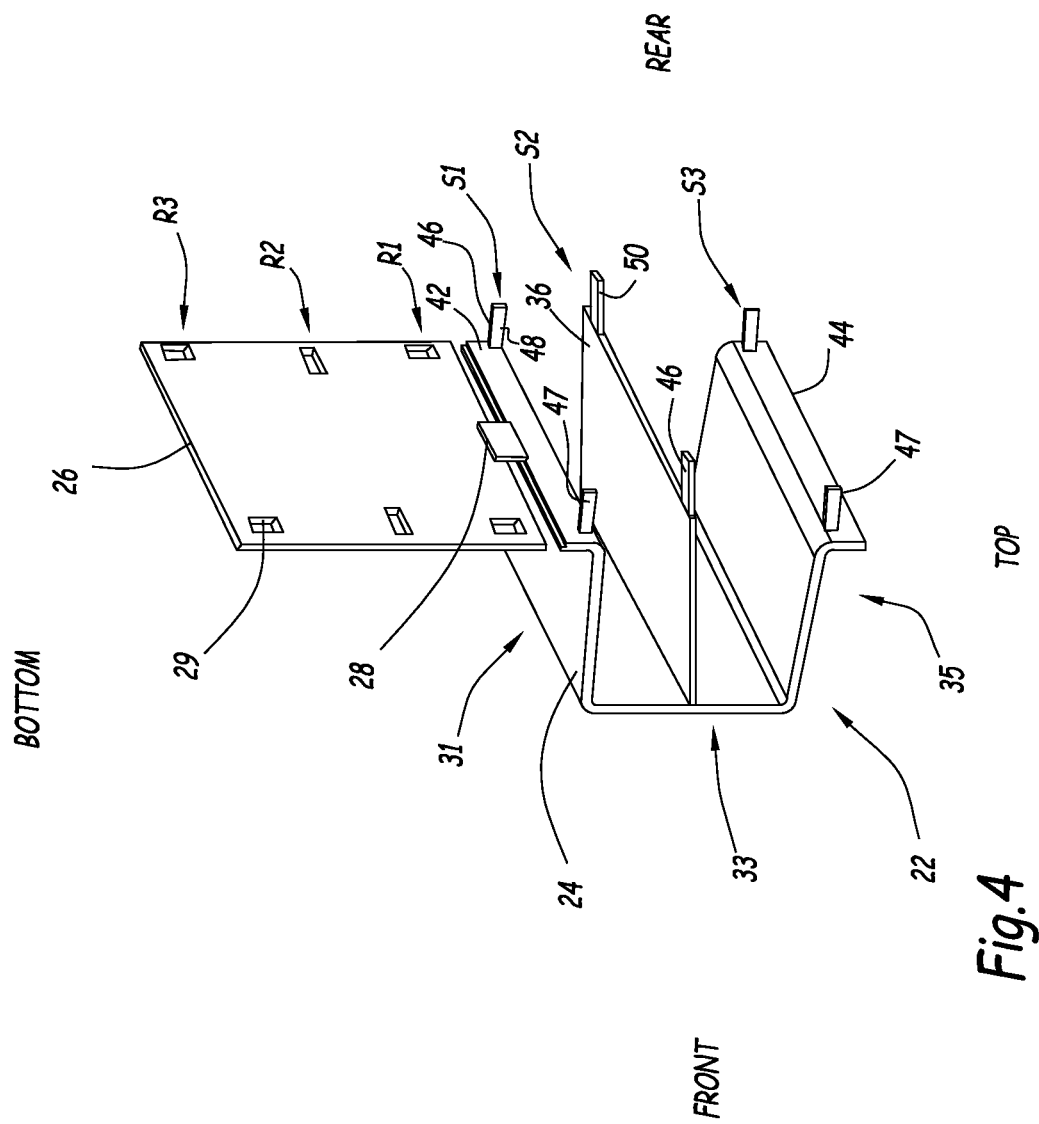

After moulding, the front end carrier 10 as shown in FIG. 3 is removed from the mould. At this stage, front end carrier 10 has a U-shaped upper structural section 12' that will later on become hollow structural section 12. The configuration of the portion 22 of the upper structural section 12' is depicted in FIG. 4.

Figure 5:
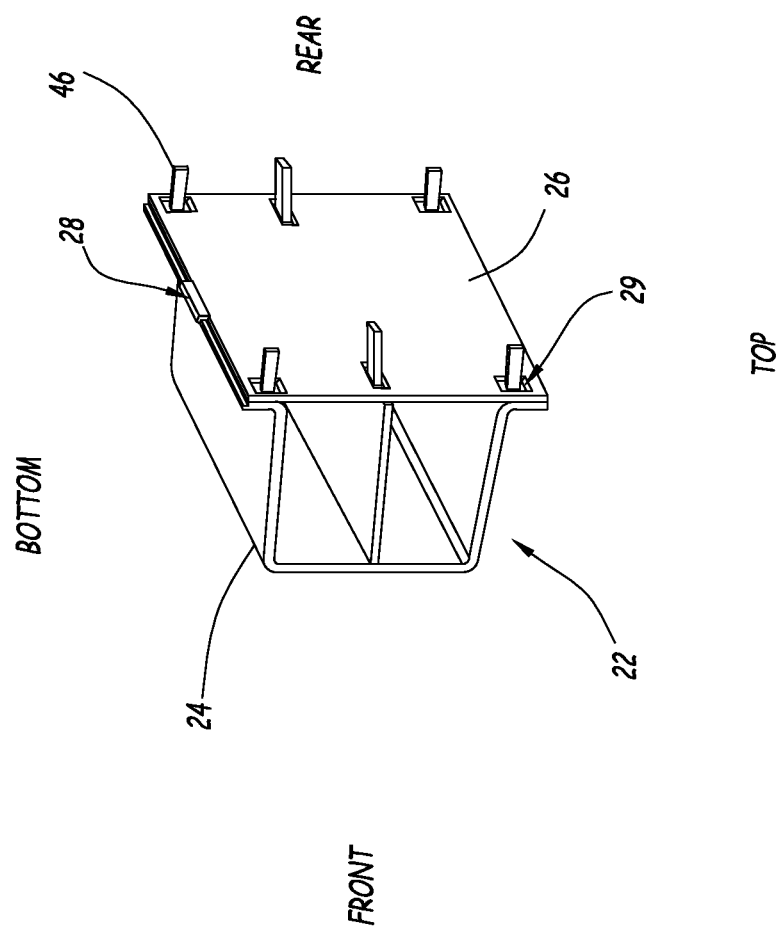

Subsequently, the section lids 26 and 52 are folded onto the section body 24 via the first and second hinge 28, 54. The resulting configuration of portion 22 is shown in FIG. 5. Rivets 46 are inserted into fastening apertures 29.

Finally, rivet heads 45 are melted by welding such as ultrasonic welding, thus fastening section lids 26 and 52 to section body 24. The result is a hollow structural section 12 as shown in FIGS. 1 and 2 adapted to withstand dynamical loads.

In a preferred embodiment, the residual heat still present in the front end carrier right after demoulding is used for folding the section lids 26, 52 onto the section body 24 and/or for riveting. Indeed, thanks to the residual heat, the hinges 28, 54 as well as the rivet heads 45 are still malleable. This advantageous use of the residual heat is only possible for plastics with a low glass transition temperature. For plastics with a high glass transition temperature, local heating of the hinges 28, 54 and the rivets 46 is needed prior to folding, respectively riveting.

In a variant of the manufacturing method, rivets 46 may be dispensed with and sections lids 26 and 52 may be fastened to section body 24 by laser welding their periphery.

The main advantages of the present invention can be summarised as follows:

A hollow structural section can be implemented in a front end carrier in a single injection moulding step followed by a simple finishing involving folding and welding;

Thanks to the hollow structural section, the inventive front end carrier represents an ideal trade-off between the conflicting aims of minimising weight and maximising stiffness;

No additional component separate from the front end carrier is needed for the hollow structural section;

Since the inventive front end carrier is manufactured as one integral piece, it contracts evenly, which prevents warping.

The invention claimed is:

1. An injection-moulded structural component (10) with a hollow structural section (12), said hollow structural section comprising:
a section body (24) having a cavity (30) with an opening (34);
a section lid (26) secured to said section body via a hinge (28) and hinge-folded onto said opening; and
a fastening means (46) fastening the section lid (26) to the section body (24) onto the opening (34) and preventing an unfolding of the section lid (26).

2. The structural component of claim 1, wherein the fastening means comprises a circumferential welding seam.

3. The structural component of claim 1, wherein the fastening means comprises a plurality of rivets (46).

4. The structural component of claim 3, wherein the rivets have welded rivet heads (45).

5. The structural component of claim 3, wherein the rivets (46) are integrally formed with one of the section body (24) or the section lid (26) and extend through corresponding apertures (29) in the other of the section body (24) or the section lid (26).

6. The structural component of claim 3, wherein each rivet (46) has a shaft (47) with a shaft broad side (48) and a shaft narrow side (50), the shaft broad side (48) of at least two different rivets having a different orientation.

7. The structural component of claim 6, with a first rivet having a shaft broad side (48) at a right angle to the shaft broad side (48) of a second rivet.

8. The structural component of claim 1, made of reinforced plastic, such as glass-fibre reinforced plastic, in particular glass-fibre reinforced polypropylene.

9. The structural component of claim 1 including a reinforcing metal insert.

10. The structural component of claim 1, at least the section body (24), the section lid (26) and the hinge (28) being made from the same material.

11. The structural component of claim 1, consisting of an automotive front end carrier (10).

12. An automotive front end module comprising the structural component of claim 1.

13. A method of manufacturing a structural component (10) with a hollow structural section (12), in particular the structural component of, claim 1 comprising the following steps:
injection-moulding the structural component (10) with a section body (24) having an open cavity (30) and a section lid (26) secured to the section body via a hinge (28), wherein the section lid sticks out in an open position from the section body (24);
hinge-folding the section lid (26) onto the section body (24) thus closing the open cavity (30); and fastening the section lid (26) to the section body (24) and onto the open cavity (30) thus obtaining the hollow structural section (12), the fastening being such that an unfolding of the section lid (26) is prevented.

14. The method of claim 13, wherein the fastening involves laser or ultrasonic welding.

15. The method of claim 13, wherein the fastening involves riveting.

* * * * *